(12) United States Patent
Ellegård et al.

(10) Patent No.: US 11,627,748 B2
(45) Date of Patent: Apr. 18, 2023

(54) PROCESSED PROTEIN PRODUCT

(71) Applicant: Hamlet Protein A/S, Horsens (DK)

(72) Inventors: Katrine Hvid Ellegård, Ry (DK); Karl Kristian Thomsen, Horsens (DK); Jonatan Ahrens Dickow, Stouby (DK)

(73) Assignee: Hamlet Protein A/S, Horsens (DK)

( * ) Notice: Subject to any disclaimer, the term of this patent is extended or adjusted under 35 U.S.C. 154(b) by 135 days.

(21) Appl. No.: 16/346,456

(22) PCT Filed: Nov. 8, 2017

(86) PCT No.: PCT/EP2017/078643
§ 371 (c)(1),
(2) Date: Apr. 30, 2019

(87) PCT Pub. No.: WO2018/087167
PCT Pub. Date: May 17, 2018

(65) Prior Publication Data
US 2020/0054041 A1  Feb. 20, 2020

(30) Foreign Application Priority Data

Nov. 10, 2016  (EP) .................................. 16198118

(51) Int. Cl.
| | |
|---|---|
| A23J 1/14 | (2006.01) |
| A23K 20/147 | (2016.01) |
| A23K 10/30 | (2016.01) |
| A23L 33/185 | (2016.01) |
| A23L 11/30 | (2016.01) |
| A23J 3/16 | (2006.01) |
| B01D 61/02 | (2006.01) |
| B01D 61/14 | (2006.01) |

(52) U.S. Cl.
CPC . *A23J 1/14* (2013.01); *A23J 3/16* (2013.01); *A23K 10/30* (2016.05); *A23K 20/147* (2016.05); *A23L 11/32* (2016.08); *A23L 33/185* (2016.08); *B01D 61/025* (2013.01); *B01D 61/145* (2013.01); *A23V 2002/00* (2013.01)

(58) Field of Classification Search
CPC ....... A23V 2250/5488; A23J 1/14; A23J 3/16; A23J 1/006; A23J 1/142; A23J 3/346; A23L 33/185; A23L 11/32; A23L 11/03
See application file for complete search history.

(56) References Cited

U.S. PATENT DOCUMENTS

| | | | |
|---|---|---|---|
| 3,635,726 A | 1/1972 | Sair | |
| 4,410,554 A | 10/1983 | Sailer | |
| 4,855,159 A | 8/1989 | Takao et al. | |
| 5,936,069 A * | 8/1999 | Johnson | A23J 1/14 530/378 |
| 6,238,725 B1 | 5/2001 | Bush et al. | |
| 6,369,200 B2 * | 4/2002 | Dobbins | A61K 36/48 426/429 |
| 2007/0014910 A1 | 1/2007 | Altemueller et al. | |
| 2008/0008815 A1 | 1/2008 | Cho | |
| 2010/0068336 A1 | 3/2010 | Singh et al. | |
| 2013/0183429 A1 | 7/2013 | Samoto et al. | |
| 2019/0254308 A1 | 8/2019 | Ellegard et al. | |

FOREIGN PATENT DOCUMENTS

| | | |
|---|---|---|
| AU | 4055772 A | 10/1973 |
| AU | 765679 B2 | 9/2003 |
| WO | WO-03/079806 B2 | 10/2003 |
| WO | WO-2013/171259 A2 | 11/2013 |
| WO | WO-2016/029314 A1 | 3/2016 |

OTHER PUBLICATIONS

Endres, Joseph G., Ph.D., Soy Protein Products: Characteristics, Nutritional Aspects, and Utilization, Revised and Expanded Edition, AOCS Press, 2001, pp. 16, 23. (Year: 2001).*
Wildman, Robert E., Handbook of Nutraceuticals and Functional Foods, CPC Press, 2001, pp. 62 (Year: 2001).*
Singh et al., "Functional and Edible Uses of Soy Protein Products," Comprehensive Reviews in Food Science and Food Safety, vol. 7, pp. 14-28 (2008).
Office Action dated May 24, 2021, in U.S. Appl. No. 16/346,501 (US 2019/0254308).
Office Action dated Oct. 21, 2021, in U.S. Appl. No. 16/346,501 (US 2019-0254308).
Office Action dated Mar. 4, 2022, in U.S. Appl. No. 16/346,501 (US 2019-0254308).
Pandjaitan, Enrichment of Genistein in Soy Protein Concentrate with B-Glucosidase, Journal of Food Science: Food Chemistry and Toxicology, vol. 65, No. 3, 2000, pp. 403-407. (Year: 2000).

* cited by examiner

*Primary Examiner* — Hong T Yoo

(74) *Attorney, Agent, or Firm* — Foley & Lardner LLP

(57) ABSTRACT

The present invention relates to a processed, solid soya protein product derived from soya bean meal (SBM) which protein product comprises 65-75% protein by weight of dry matter, has a protein to potassium weight ratio of at least about 70:1 and a dry matter content of at least about 90%, which product is substantially free of sodium, and wherein at least about 65% by weight of the indigestible oligosaccharide content of the SBM wherefrom the protein product is derived has been removed. The invention further relates to a leaching method for manufacture of the product as well as product obtainable by the method and use of the processed, solid soya protein product.

17 Claims, No Drawings

PROCESSED PROTEIN PRODUCT

CROSS-REFERENCE TO RELATED APPLICATIONS

The present application is the U.S. national stage of International Application No. PCT/EP2017/078643, filed Nov. 8, 2017, and claims priority to Europe Patent Application No. 16,198,118.8, filed Nov. 10, 2016.

FIELD OF THE INVENTION

The present invention relates to a processed, solid soya protein product having a modified sugar and modified mineral profile in comparison with soya bean meal and a method for the production thereof.

BACKGROUND OF THE INVENTION

There is a need for bio-products that primarily can be used as ingredients in animal feed or food. The basic constituents in the products are proteins, fats and carbohydrates. Suitable biomasses for the products are grasses and oil bearing crops, such as seeds, cereals and pulses. One particularly interesting pulse is soya bean due to its high protein content which can be up to 45%, based on dry matter.

The soya bean [*Glycine max* (L.) Merrill belongs to the family Leguminosae or Fabaceae, subfamily Faboidae] originated in Eastern Asia, see http://www.fao.org/docrep/t0532e/t0532e02.htm. Soya beans have been grown as a food crop for thousands of years in China and other countries of East and South East Asia and constitute still today an important component of the traditional popular diet in these regions. Soya beans are primarily an industrial crop, cultivated for oil and protein. It has a relatively low oil content of the seed (about 20% on moisture-free basis), but still soya beans are a large single source of edible oil. With each ton of crude soya bean oil, approximately 4.5 tons of soya bean meal (SBM) with a protein content of about 44% are produced. For each ton of soya beans processed, the commercial value of the meal obtained usually exceeds that of the oil.

The approximate average chemical composition of soya bean, measured on moisture-free basis, is 40% protein; 20% fat, mostly triglycerides and some phospholipids; 35% carbohydrate in the form of soluble oligosaccharides (sucrose, raffinose, stachyose, verbascose) and insoluble fibre; and 5% ash comprising the minerals, in particular potassium, calcium and magnesium. However, the mineral composition of soya beans is affected by the composition of the soil where it is cultivated.

The nutritional quality of the protein measured by its chemical score as essential amino acid composition can be found in http://www.fao.org/docrep/t0532e/t0532e02.htm. The proteins can be characterised by their solubility in various media. The solubility in water of soya bean protein is strongly affected by the pH. About 80% of the protein in raw seeds can be extracted at neutral or alkaline pH. When acidity is increased, solubility drops rapidly and it is at a minimum in the isoelectric region of pH 4.2-4.6. This property has been used in prior art methods for the manufacture of soya bean protein products.

Some soya bean proteins, such as trypsin inhibitors, allergens and lectins, are known as anti-nutritional factors. They exert specific physiological effects. Trypsin inhibitors impair protein digestion by inactivating trypsin and are considered harmful for the nutritional value of soya bean and to be responsible for impaired growth in chickens. β-conglycinin is a soy allergen inducing intestinal inflammation and dysfunction.

A general problem related to soya bean is the high content of indigestible oligosaccharides causing flatulence when fermented in the gut. The presence of the oligosaccharides, in particular raffinose, stachyose and verbascose, can be reduced by soaking in water or enzymatically by hydrolysis with α-galactosidase. One problem associated with this is that it adds to the cost of the final product due to the use of water in soaking or by an enzymatic treatment that has traditionally been performed at a relatively high water content of 80% or more.

U.S. Pat. No. 6,238,725 B1 discloses a method for preparing a legume where the flatulence-causing oligosaccharides are removed by soaking in water.

WO 2013/171259 discloses a method for the production of a solid soy-product wherein at least 80% of the original indigestible oligosaccharides has been removed enzymatically by hydrolysis with α-galactosidase.

When soya bean is processed into meal and oil, most of the mineral constituents, including the potassium and the magnesium, go with the soya bean meal (SBM) and few with the oil. When the soya bean is processed to a feed for e.g. chickens the content of potassium, sodium and magnesium should be reduced as much as possible in order to enhance the nutritional value of the feed and to raise the wellbeing of the chickens. The chickens drink less water when the content of potassium, sodium and magnesium is reduced in the feed, whereby the incidences of foot injuries caused by wet stools are reduced. On the other hand, it is important to keep the content of other minerals, in particular iron, zinc and calcium, high and at least as high as in the soya bean.

US2010/0068336 A1 relates to a hydration method for processing soya bean meal comprising particle size reduction of hydrated material and physical separation of "enhanced oilseed meal" from size reduced oil seed, optionally applying pH adjustment during the hydration step. The method appears to be a wet granulation. The resulting products are characterised by a protein content of about 78-84% protein, and the moisture content appears to be low, about 3-4%, however the mineral profile is not disclosed.

U.S. Pat. No. 3,635,726 relates to a hydration method where soya bean material is hydrated with several additions of water at pH close to 7 followed by separation into a liquid phase and a solid protein phase. The liquid phase is pH-adjusted with acid to a pH at the isoelectric point (pH 4 to 4.8), and is then centrifuged or decanted to recover protein in a solid phase. Two or more fractions of soy bean isolate are collected and after-treated such as by drying. The resulting products are characterised by a protein content of about 73-85% protein, however, the mineral profile is not mentioned.

U.S. Pat. No. 4,410,554 discloses a process for preparing a novel soy protein concentrate comprising 72-73% protein and having functional properties normally associated with soy protein isolate by leaching at (slightly) acid pH in three subsequent steps.

US 2013/0183429 discloses a processed soybean product comprising 48-49 weight % protein, 0.4-0.6 weight % potassium and 0.4-0.5 weight % stachyose or less together with lipid and dietary fibers.

None of the prior art methods focuses on providing a solid protein product having a modified and advantageous mineral profile combined with a reduced content of oligosaccharides and at the same time a rather high content of protein. In particular, none of the methods focuses on providing products having an advantageous protein to potassium ratio and reduced content of potassium and magnesium.

The object of the present invention is to provide processed, solid soy protein product having a relatively high content of protein of high quality and at the same time a modified sugar profile and a modified mineral profile in comparison with soy bean meal (SBM) and in particular low potassium content. Another object is to provide an improved method for the production of such products, which can be produced at lower costs due to processing at low temperatures and at low water ratios, possibly including water recirculation, and thereby saving in water consumption and in heat application in comparison with prior art methods.

Yet another object is to provide processed, solid soy protein product having a water holding capacity adapted for specific purposes.

These objects are fulfilled with the process and the products of the present invention.

SUMMARY OF THE INVENTION

Accordingly, the present invention relates in a first aspect to a processed, solid soya protein product derived from soya bean meal (SBM) which protein product comprises 65-75% protein by weight of dry matter, has a protein to potassium weight ratio of at least about 65:1 and a dry matter content of at least about 90%, which product is substantially free of sodium, and wherein at least about 65% by weight of the indigestible oligosaccharide content of the SBM wherefrom the protein product is derived has been removed In a second aspect the invention relates to a water leaching method for the manufacture of a processed, solid soya protein product according to any of the claims 1 to 10, which method comprises the following sequence of steps:
1) providing an initial mixture comprising milled or flaked or otherwise disintegrated soya bean material (SBM) and water;
2) leaching the initial mixture under conditions where the dry matter amount in the initial mixture is between 8 and 20% by weight, for 0.15 to 6 hours at a temperature of 5 to 65° C. and at a pH of 3.5 to 5.5;
3) separating the leached mixture in a liquid extract and a first solid fraction;
4) collecting the first solid fraction;
5) optionally conveying the liquid extract from step 3) through means for further separation of solids, such as decanter centrifuging, thereby recovering a second solid fraction, and combining the second solid fraction with the first solid fraction; and
6) drying the first solid fraction or the combined solid fractions from steps 4) and 5) to a dry matter of at least 90%;
wherein the total amount of spent water in the method calculated from the initial SBM starting material is about 10 times the amount of SBM or less.

It is surprising that it is possible to provide soya protein products having at the same time a rather high content of protein of a quality wherein a large amount of the indigestible oligosaccharides has been removed and with an advantageous mineral profile in particular in relation to potassium. Thus, a large part of the potassium in the SBM source has been removed from the product, thereby creating a product with a protein to potassium ratio of at least 65:1. The potassium content in SBM varies depending of the source and the composition of the cultivation soil. Typical SBM from different cultivation soils varies from 1.8-2.6%, see e.g. Batal et al, Poultry Science Association (2010): "Mineral composition of corn and soybean meal".

The products will also hold a beneficial high content of isoflavones.

It is further surprising that such products can be obtained by a rather simple leaching process wherein the process features are selected in such a way that production costs are considerably reduced. Thus, the leaching process can be conducted without heating and/or by using tap water or water at room temperature. Furthermore, the process can be conducted by the use of a single leaching step or no more than two leaching steps and by addition of only one portion of water. Finally, the process can be adapted to recirculate and re-use of water so that further water saving is achieved.

Another benefit is that the product resulting from the method only contains minor amounts of water due to the low water content during the process, and accordingly, drying of the product can be performed at low costs due to the minor amount of water to be removed.

The invention further provides a processed, solid soya protein product obtainable by a method of the invention, and also provides uses of the processed, solid soya protein product and a feed and a food product or a nutritional supplement containing 1-99% of the protein product.

Definitions

In the context of the current invention, the following terms are meant to comprise the following, unless defined elsewhere in the description.

The terms "about", "around", "approximately", or "~" are meant to indicate e.g. the measuring uncertainty commonly experienced in the art, which can be in the order of magnitude of e.g. +/−1, 2, 5, or even 10%.

The term "comprising" is to be interpreted as specifying the presence of the stated part(s), step(s), feature(s), composition(s), chemical(s), or component(s), but does not exclude the presence of one or more additional parts, steps, features, compositions, chemicals or components. E.g., a composition comprising a chemical compound may thus comprise additional chemical compounds, etc.

The term "indigestible" is to be interpreted as not digestible by humans and monogastric/non-ruminant animals.

The term "at least about 65% by weight of the indigestible oligosaccharide content of the SBM [source] has been remove" is to be interpreted as specifying that the total content of indigestible oligosaccharides in the SBM source has been reduced by at least 65% and also includes products wherein one type of oligosaccharide may be reduced to a larger extent than another type of oligosaccharide, and even wherein one type of oligosaccharide may be reduced only in a minor extent, as long as the total content of the original— starting—oligosaccharides has been reduced as specified by at least 65%.

The content of indigestible oligosaccharides in SBM varies with the source of SBM and the cultivation soil, and it is typically 6-9%.

Biomass:

Comprises biological material produced by the photosynthesis and that can be used in industrial production.

In this context, biomass refers to plant matter in the form of grasses, cereals, seeds, nuts, beans and peas, etc., and mixtures thereof.

Furthermore a biomass comprising pulses is preferred due to the protein content and composition. They also contain carbohydrates comprising alpha-galactosides.

Soya Bean Products:

Refers to plant matter in the form of soya bean products and mixtures thereof. The soya bean meal (SBM) can be from any soya bean source, such as from South or North America or Asia or Europe, and it can be of gene modified origin (GMO) or of non-gene modified origin (non-GMO).

They also contain carbohydrates comprising α-galactosides. In general the principal α-galactoside is stachyose.

Otherwise Disintegrated:

Means disintegrated by cooking and/or by maceration and/or acid or alkaline pressure-cooking, or ultrasonic treatment.

Oligosaccharides and Polysaccharides:

An oligosaccharide is a saccharide oligomer containing a small number of component monomer sugars, also known as simple sugars. Typical examples are the trisaccharide raffinose (D-galactose-α1,6-D-glucose-α1,β2-D-fructose), the tetrasaccharide stachyose (D-galactose-α1,6-D-galactose-α1,6-D-glucose-α1,β2-D-fructose) and the pentasaccharide verbascose (D-galactose-α1,6-D-galactose-α1,6-D-galactose-α1,6-D-glucose-α1,β2-D-fructose).

Polysaccharides are saccharide polymers containing a large number of component monomer sugars, also known as complex carbohydrates. If the monomer sugars are of the same type the polysaccharide is called a homopolysaccharide, but when more than one type is present they are called heteropolysaccharides.

Examples include storage polysaccharides such as starch and structural polysaccharides such as cellulose and arabinoxylan.

Processed Food Products:

Comprise dairy products, processed meat products, sweets, desserts, ice cream desserts, canned products; freeze dried meals, dressings, soups, convenience food, bread, cakes, etc.

Processed Feed Products:

Comprise ready-to-use feed or feed ingredients for animals such as piglets, calves, poultry, furred animals, sheep, cats, dogs, fish and crustaceans, etc.

DETAILED DESCRIPTION OF THE INVENTION

The Processed, Solid Product of the Invention in its First Aspect:

The soya bean meal (SBM) can be of any origin and it can be GMO or non-GMO.

The processed, solid soya protein product comprises about 65-75% protein by weight of dry matter, such as 65%, 65.5%, 66%, 66.5%, 67%, 67.5%, 68%, 68.5%, 69%, 70%, 71%, 72%, 73%, 74%, or 75%.

The protein to potassium ratio is at least 65:1, e.g. at 70:1, at least 72:1, at least 75:1, at least 80:1, at least 85:1, or even at least 90:1.

The dry matter percentage in the products of the invention is at least about 90%, such as at least 92%, at least 94%, at least 95%, at least 96%, at least 97%, or at least 98%.

At least about 65% by weight of the original indigestible oligosaccharide content of the SBM source has been removed, such as at least 70%, 75%, 80%, 85%, 90, or 95%. The original SBM indigestible oligosaccharides which have been removed in the product of the invention are primarily raffinose, stachyose, and verbascose.

The content of indigestible oligosaccharides in SBM varies with the source of SBM and the cultivation soil, and it is typically 6-9%, og which at least 65% has been removed in the processed, solid soya product of the invention. Thus, the content of the indigestible oligosaccharides in the product is 3% or less.

The products are substantially free of sodium, which means that it comprises less than 0.1%, such as less than 0.01% or less than 0.005% or less than 0.001% in any of the above embodiments.

The Processed, Solid Product of the Invention in its Third Aspect:

In its third aspect the invention related to a processed, solid soya protein product obtainable by a method according to the invention.

The soya bean meal can be of any origin and it can be GMO or non-GMO.

The processed, solid soya protein product comprises about 65-75% protein by weight of dry matter, such as 65%, 65.5%, 66%, 66.5%, 67%, 67.5%, 68%, 68.5%, 69%, 70%, 71%, 72%, 73%, 74%, or 75%.

The protein to potassium ratio is at least 65:1, e.g. at least 70:1, at least 72:1, at least 75:1, at least 80:1, at least 85:1, or even at least 90:1.

The dry matter percentage in the products of the invention is at least about 90%, such as at least 92%, at least 94%, at least 95%, at least 96%, at least 97%, or at least 98%.

At least about 65% by weight of the original indigestible oligosaccharide content of the SBM source has been removed, such as at least 70%, 75%, 80%, 85%, 90, or 95%.

The original soya bean indigestible oligosaccharides which have been removed in the product of the invention are primarily raffinose, stachyose, and verbascose. The content of indigestible oligosaccharides in SBM varies with the source of SBM and the cultivation soil, and it is typically 6-9%, og which at least 65% has been removed in the processed, solid soya product of the invention. Thus, the content of the indigestible oligosaccharides in the product is 3% or less.

The products of the invention or obtained by the process of the invention are substantially free of sodium, which means that it comprises less than 0.1%, such as less than 0.01% or less than 0.005% or less than 0.001% in any of the above embodiments.

Further Embodiments of the Products of the Invention in its First or its Third Aspect In a second embodiment of the invention the processed, solid soya protein product may further comprise processed biological material from other biomass sources, such as grasses, cereals, seeds, nuts, beans or peas, or mixtures thereof, in amounts up to e.g. 5%, 10%, 15%, 20%, 25%, 30%, or 40%.

In a third embodiment of the invention at least about 50% of the original potassium content of the SBM source has been removed so as to provide a processed, solid soya protein product wherein the protein to potassium ratio is at least about 65:1. The amount of potassium in the soya bean meal (SBM) depends on the cultivating soil and may typically vary from 1.8 to 2.7. In further embodiments at least 55%, at least 58%, at least 60%, at least 65%, at least 70%, at least 75%, or at least 80% of the original potassium content may have been removed. In such embodiments, or in alternative embodiments, the processed, solid soya protein product may comprise 1.1% or less, e.g. 1.0% or less, 0.9% or less, 0.8% or less, 0.7% or less, 0.6% or less, 0.5% or less, 0.4% or less, 0.3% or less, 0.2% or less, or 0.1% or less.

The amount of magnesium in soya bean meal (SBM) depends on the cultivating soil and may typically vary from 0.3 to 0.4%. In any of the above embodiments at least about 30% of the original magnesium content of the SBM source may have been removed in the processed, solid soya protein product, e.g. at least 35%, at least 40%, at least 45%, or at least 50% has been removed. In such embodiments, or in alternative embodiments, the processed, solid soya protein product measured on the dry matter content may comprise about 0.3% magnesium or less, such as 0.25% or less, e.g. 0.2% or less, 0.15% or less, or 0.1% or less.

In any of the above embodiments the amounts of calcium and copper may be substantially unchanged in comparison with soy bean meal, thus the amount of calcium measured on the dry matter content is about 0.2-0.5%, e.g. about 0.3-0.4%, and the amount of copper measured on the dry matter content is about 10-25 mg/kg, e.g. about 11, 12, 13, 14, 15, 16, 17, 18, 19, 20, 22, or 25 mg/kg, both depending of the cultivating soil for the soya bean. The amount of calcium and copper in soya bean meal (SBM) depends on the cultivating soil and may typically vary from 13-25 mg/kg copper and 0.2-0.5% calcium.

In any of the above embodiments the processed, solid soya protein products may comprise on a dry matter basis at least about 0.1% isoflavone(s), e.g. at least 0.12%, at least 0.14%, at least 0.15%, at least 0.18%, at least 0.2%, at least 0.22%, at least 0.25%, at least 0.27%, or at least 0.30%. Examples of isoflavones are Daidzein, Daidzin, Genistein, Genistin, Glycetein, and Glycetin.

In any of the above embodiments of the processed, solid soya product the amount of iron may be increased by at least about 15% by weight in comparison with the content of the SBM source, e.g. at least 20%, at least 25%, at least 30%, at least 35%, at least 40%, at least 45%, or even at least 50%. Simultaneously or alternative, the amount may be at least 100 mg/kg, e.g. from about 100-200 mg/kg, e.g. 110, 120, 130, 140, 150, 160, 170, 180, or 190 mg/kg, depending of the cultivating soil for the soya bean. The amount of iron in soya bean meal (SBM) depends on the cultivating soil and may typically vary from 80-300 mg/kg.

In any of the above embodiments the water holding capacity may be low or high, depending of the intended final application. In one of such embodiments the capacity is low, e.g. less than 5 mL/g, less than 4 mL/g, less than 3 mL/g, less than 2 mL/g, or less than 1 mL/g.

In any of the above embodiments the processed, solid soya protein products measured on the dry matter content may comprise at least about 20 mg/kg zinc, e.g. at least 30 mg/kg, at least 35 mg/kg, at least 40 mg/kg, at least 45 mg/kg, at least 50 mg/kg, or at least 60 mg/kg zinc. The amount of zinc in soya bean meal (SBM) depends on the cultivating soil and may typically vary from 40-70 mg/kg.

In any of the above embodiments the processed, solid soya protein products measured on the dry matter content may comprise at least about 15 mg/kg manganese, e.g. at least 20 mg/kg, at least 25 mg/kg, at least 30 mg/kg, at least 35 mg/kg, at least 40 mg/kg, or at least 50 mg/kg. The amount of manganese in soya bean meal (SBM) depends on the cultivating soil and may typically vary from 25-60 mg/kg.

The Water Leaching Method of the Invention in its Second Aspect:

The water content in the initial reaction mixture of the method of manufacture of the processed, solid soya protein product does not exceed about 92% by weight, which implies that the dry matter content in the mixture is at least about 8%. More specifically, it is between 8 and 20%, such as between 8 and 15%, such as between 10 and 15%, such as between 10 and 12%.

The reaction time is 0.15-6 hours at a temperature of 5-65° C. The temperature may e.g. vary from 7-60° C., from 10-55° C., from 15-50° C., 20-45° C., or from 30 to 40° C.; and at the same time the reaction time may vary e.g. from 10 minutes to 6 hours, from 20 minutes to 6 hours, from 1 to 6 hours, from 2 to 5 hours, from 2 to 4 hours, from 3 to 5 hours, or from 3 to 4 hours. The method can be conducted at low temperature by use of tap water or water at room temperature, thus production costs are reduced because heat application is not required. The leaching can be performed by stirring or similar means.

The leached mixture is separated in a liquid extract and a first semi-solid fraction by any separation means, such as transfer through a cloth, sieve or screw press, or by means of a decanter centrifuge, and the first solid fraction is collected by any collecting means.

Drying to a dry matter of at least 90% is performed by well-known means, such as by fluid bed dryer, ring dryer, KIX dehydrator or spin-flash dryer.

Further Embodiments of the Leaching Method of the Invention

In one embodiment of the method of the invention it further comprises one or more of the following steps:

5(i) conveying the liquid extract from step 3) through means for further separation of solids, such as decanter centrifuging, thereby recovering a second solid fraction and collecting a liquid extract, and combining the second solid fraction with the first solid fraction; and/or 5(ii) conveying the liquid extract from step 3) and/or a liquid extract from step 5(i) through ultrafiltration means thereby recovering a third solid fraction and collecting a liquid extract, followed by optionally subjecting this collected liquid extract to reverse osmosis thereby recovering a liquid concentrate and pure water, and combining the third solid fraction with the first solid fraction; and 5(iii) re-using a liquid extract from step 5(i) and/or from steps 5(i) and 5(ii), and/or a liquid extract from step 5(i) and pure water from step 5(ii) by re-circulating the liquid extract and/or water to any of the steps 2), 5(i), or 5(ii); and 6) drying the combined solid fractions from steps 4), 5(i), and/or 5ii) to a dry matter of at least 90%.

In any embodiments of the method the initial mixture comprising milled or flakes or otherwise disintegrated SBM may further comprise biological material from other biomass sources, such as grasses, cereals, seeds, nuts, beans or peas, or mixtures thereof, in amounts up to e.g. 5%, 10%, 15%, 20%, or 25%.

In any embodiments of the method the initial mixture is leached at pH of about 3.5-5.5, e.g. at pH about 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, or 5.5. The pH can be adjusted by any organic or inorganic acid, such as formic acid, acetic acid, hydrochloride acid, sulfuric acid or phosphoric acid.

In any one of the above embodiments of the method of the invention, further de-watering of the solid fraction or the combined solid fractions may be conducted by squeezing or similar means to a dry matter content of at least 20%, such as at least 25%, e.g. at least 30%, before drying.

In any of the above embodiments of the method of the invention the leaching may be performed in any type of container with mixing/stirring and sufficient holding time, such as one or more non-vertical, interconnected paddle worm or continuous worm conveyers or a continuous stirred tank reactor with inlet means for the reaction mixture and additives and outlet means for the product. Control means for rotation speed, temperature, and pH may also be included. The continuous worm conveyer can be an optionally modified type of a single bladed or multi bladed screw or intersected screw conveyor designed to transport the reacting mixture and at the same time lifting the material so that it is transported and agitated without compacting it.

In any of the above embodiments the extraction method can be performed as a batch, fed-batch, continuous process or counter flow process.

In any of the above embodiments the liquid extract from step 3) may be conveyed through means for further separation of solids before re-use in a further leaching mixture.

In any of the above embodiments the method may comprise no more than one leaching step.

In any of the above embodiments the method may comprise no more than two leaching steps.

The invention in a 4$^{th}$ aspect also relates to the use of a processed, solid soya product according to the invention in a processed food product; as an ingredient to be used in a food or feed product for animal consumption, or as an ingredient in a nutritional supplement.

Finally, in a 5$^{th}$ aspect the invention relates to a food or feed product or a nutritional supplement containing from 1 to 99% by weight of a processed, solid soya protein product according to the invention.

EXAMPLES

Materials and Methods:

Soya bean meal (SBM) was obtained from different sources, including Non-GMO batch from Brazil (SBM395), GMO batch from Brazil (SBM466) and GMO batch from Paraguay (SBM478)

The content of indigestible oligosaccharides in the watery extracts of the biomass/Solid protein product can be analysed by thin layer chromatography on TLC silica gel 60 plates (Merck). The different components were quantified by comparison to standards of known concentration. Soluble carbohydrate was determined by the "Phenol-sulphuric assay" as described in: Carbohydrate *analysis—A practical approach*; IRL Press, Oxford. Ed. M. F. Chaplan & J. F. Kennedy, 1986 p 2.

Example 1

Leaching in a Batch Process at Room Temperature at pH 4.5 of a SBM from 'SBM 395'

100 g of soya bean meal was suspended in water at room temperature to a total volume of 1000 ml. The pH was adjusted to 4.5 with sulfuric acid, and the suspension was stirred for 30 minutes while keeping this constant pH.

The leached mixture was transferred to a cloth and de-watered at room temperature to a dry matter content (DM) of about 35%.

The solid fraction was collected and dried in a fluid bed dryer to a dry matter content of approx. 95%.

The product was analysed for content of protein, minerals, trace elements and dry matter.

The results are shown in table 1 in comparison with SBM.

Example 2

Leaching in a Batch Process at Room Temperature at pH 3.5 of a SBM from 'SBM 395'

The process of example 1 was repeated with the exception that the pH was adjusted to 3.5 with sulfuric acid.

The solid fraction was collected and dried in a fluid bed dryer to a dry matter content of approx. 95%.

The product was analysed for content of protein, minerals, trace elements and dry matter. The results are shown in table 1.

Example 3

Leaching in a Batch Process at Room Temperature at pH 5.5 of a SBM from 'SBM 395'

The process of example 1 was repeated with the exception that the pH was adjusted to 5.5 with sulfuric acid.

The solid fraction was collected and dried in a fluid bed dryer to a dry matter content of approx. 95%.

The product was analysed for content of protein, minerals, trace elements and dry matter. The results are shown in table 1.

Comparative Example 1

Leaching in Batch Process without pH Regulation of a SBM from 'SBM 395'

The process of example 1 was repeated with 100 g SBM suspended in 900 ml demineralised water at about 6.5 (=no pH adjustment).

The product was analysed for content of protein, minerals, trace elements and dry matter. The results are shown in table 1.

TABLE 1

|  | Reference SBM | Extracted SBM pH 3.5 | Extracted SBM pH 4.5 | Extracted SBM pH 5.5 | Extracted SBM pH 6.5 |
| --- | --- | --- | --- | --- | --- |
| Protein of dry matter % | 56.5 | 67.9 | 68.2 | 67.8 | 66.9 |
| Sodium (Na) % | <0.01 | <0.01 | <0.01 | <0.01 | <0.01 |
| Potassium (K) % | 2.34 | 0.72 | 0.82 | 1.05 | 1.25 |
| Protein:potassium ratio | 24 | 94 | 83 | 65 | 54 |
| Magnesium (Mg) % | 0.33 | 0.18 | 0.20 | 0.22 | 0.23 |
| Calcium (Ca) % | 0.30 | 0.29 | 0.31 | 0.32 | 0.34 |
| Copper (Cu) mg/kg | 13.3 | 12.9 | 12.3 | 11.0 | 9.7 |
| Iron (Fe) mg/kg | 113 | 141 | 163 | 135 | 129 |
| Zinc (Zn) mg/kg | 54.3 | 42.8 | 45.8 | 57.5 | 62.2 |
| Manganese (Mn) mg/kg | 30.0 | 23.4 | 26.7 | 30.0 | 34.1 |

From the results it can be seen that a product of the invention after extraction at pH=3.5, 4.5 or 5.5 has a protein content of about 68% by weight of dry matter and a modified mineral profile. In particular, the content of potassium is reduced to about one third of the content in SBM (reference). Magnesium is reduced to about two thirds of the original content while calcium and copper content is unaffected. The content of zinc and manganese is only moderately affected by the acidic extraction.

Comparative Example 2

Leaching in Batch Process without pH Regulation of a SBM from 'SBM 466'

The process of example 4 was repeated with 100 g SBM suspended in 900 ml demineralised water at about 6.5 (=no pH adjustment).

The product was analysed for content of minerals and trace elements. The results are shown in table 2.

TABLE 2

|  | Reference SBM | Extracted SBM pH 3.5 | Extracted SBM pH 4.5 | Extracted SBM pH 5.5 | Extracted SBM pH 6.5 |
| --- | --- | --- | --- | --- | --- |
| Sodium (Na) % | <0.01 | <0.01 | <0.01 | <0.01 | <0.01 |
| Potassium (K) % | 2.38 | 0.68 | 0.89 | 1.07 | 1.26 |
| Magnesium (Mg) % | 0.33 | 0.16 | 0.20 | 0.20 | 0.22 |
| Calcium (Ca) % | 0.28 | 0.24 | 0.28 | 0.28 | 0.30 |
| Copper (Cu) mg/kg | 8.8 | 10.2 | 10.2 | 10.0 | 9.9 |
| Iron (Fe) mg/kg | 92 | 110 | 114 | 100 | 96 |
| Zink (Zn) mg/kg | 50.5 | 38.4 | 42.8 | 48.9 | 51.1 |
| Manganese (Mn) mg/kg | 28.8 | 21.1 | 25.9 | 28.1 | 33.0 |

Example 4

Leaching in a Batch Process at Room Temperature at pH 4.5 of a SBM from 'SBM 466'

100 g of soya bean meal was suspended in water at room temperature in a total volume of 1000 ml. The pH was adjusted to 4.5 with sulfuric acid, and the suspension was stirred for 30 minutes while keeping this constant pH.

The leached mixture was transferred to a cloth and de-watered at room temperature to a dry matter content (DM) of about 35%.

The solid fraction was collected and dried in a fluid bed dryer to a dry matter content of approx. 95%.

The product was analysed for content of minerals and trace elements. The results are shown in table 2 in comparison with SBM.

Example 5

Leaching in a Batch Process at Room Temperature at pH 3.5 of a SBM from 'SBM 466'

The process of example 4 was repeated with the exception that the pH was adjusted to 3.5 with sulfuric acid.

The solid fraction was collected and dried in a fluid bed dryer to a dry matter content of approx. 95%.

The product was analysed for content of minerals and trace elements. The results are shown in table 2.

Example 6

Leaching in a Batch Process at Room Temperature at pH 5.5 of a SBM from 'SBM 466'

The process of example 4 was repeated with the exception that the pH was adjusted to 5.5 with sulfuric acid.

The solid fraction was collected and dried in a fluid bed dryer to a dry matter content of approx. 95%.

The product was analysed for content of minerals and trace elements. The results are shown in table 2.

Example 7

Leaching in a Batch Process at Room Temperature at pH 4.5 of a SBM from 'SBM 478'

100 g of soya bean meal was suspended in water at room temperature in a total volume of 1000 ml. The pH was adjusted to 4.5 with sulfuric acid, and the suspension was stirred for 30 minutes while keeping this constant pH.

The leached mixture was transferred to a cloth and de-watered at room temperature to a dry matter content (DM) of about 35%.

The solid fraction was collected and dried in a fluid bed dryer to a dry matter content of approx. 95%.

The product was analysed for content of minerals and trace elements. The results are shown in table 3 in comparison with SBM.

Example 8

Leaching in a Batch Process at Room Temperature at pH 3.5 of a SBM from 'SBM 478'

The process of example 7 was repeated with the exception that the pH was adjusted to 3.5 with sulfuric acid.

The solid fraction was collected and dried in a fluid bed dryer to a dry matter content of approx. 95%.

The product was analysed for content of minerals and trace elements. The results are shown in table 3.

Example 9

Leaching in a Batch Process at Room Temperature at pH 5.5 of a SBM from 'SBM 478'

The process of example 7 was repeated with the exception that the pH was adjusted to 5.5 with sulfuric acid.

The solid fraction was collected and dried in a fluid bed dryer to a dry matter content of approx. 95%.

The product was analysed for content of minerals and trace elements. The results are shown in table 3.

Comparative Example 3

Leaching in Batch Process without pH Regulation of a SBM from 'SBM 478'

The process of example 7 was repeated with 100 g SBM suspended in 900 ml demineralised water at about 6.5 (=no pH adjustment).

The product was analysed for content of minerals and trace elements. The results are shown in table 3.

TABLE 3

|  | Reference SBM | Extracted SBM pH 3.5 | Extracted SBM pH 4.5 | Extracted SBM pH 5.5 | Extracted SBM pH 6.5 |
| --- | --- | --- | --- | --- | --- |
| Sodium (Na) % | <0.01 | <0.01 | <0.01 | <0.01 | <0.01 |
| Potassium (K) % | 2.34 | 0.49 | 0.65 | 0.91 | 1.15 |
| Magnesium (Mg) % | 0.34 | 0.13 | 0.18 | 0.20 | 0.23 |
| Calcium (Ca) % | 0.44 | 0.38 | 0.44 | 0.47 | 0.49 |
| Copper (Cu) mg/kg | 15.6 | 17.4 | 16.5 | 14.4 | 13.2 |
| Iron (Fe) mg/kg | 172 | 195 | 193 | 177 | 187 |
| Zinc (Zn) mg/kg | 56.7 | 36.0 | 46.5 | 53.9 | 56.3 |
| Manganese (Mn) mg/kg | 59.4 | 36.1 | 49.1 | 61.1 | 68.9 |

Example 10

Leaching in a Batch Process at Room Temperature at pH 3.5, 4.5 or 5.5 of a SBM from 'SBM 395'; Determination of Isoflavone Content The process of example 1 was repeated at each of pH 3.5, 4.5 or 5.5. The solid fraction from each of the experiments was collected and dried in an autoclave, and the dry matter content was determined to 96.1%. The content of isoflavones was analysed. The results are shown in table 4.

TABLE 4

|  | Reference SBM | Extracted SBM pH 3.5 | Extracted SBM pH 4.5 | Extracted SBM pH 5.5 |
| --- | --- | --- | --- | --- |
| Dry matter % | 88.6 | 96.1 | 96.1 | 96.1 |
| Protein of dry matter % | 56.6 | 68.4 | 69.1 | 70.2 |
| Isoflavone content % | 0.14 | 0.17 | 0.18 | 0.16 |
| Isoflavone to protein ratio | 29.4 | 25.8 | 26.6 | 24.2 |

From the results it can be seen that a product of the invention has a protein content of about 68-70% by weight of dry matter and an isoflavone content of at least 0.1%. The isoflavone to protein ratio is nearly unchanged in relation to the SMB (reference), which indicates that the isoflavones are substantially extracted from the SBM together with the protein.

Example 11

Leaching in a Batch Process with Recirculation of Water

The process of example 1 can be repeated with the following modification:

100 g of soya bean meal is suspended in 1000 ml of water at room temperature. The pH is adjusted to either 3.5 or 4.5 with sulfuric acid, and the suspension is stirred for 30 minutes while keeping this constant pH.

The leached mixture is transferred to a cloth and de-watered at room temperature to a dry matter content (DM) of about 35%.

The liquid extract from the de-watering process is collected, wherefrom a further solid fraction can be collected and added to the first, dewatered solid fraction, and a water fraction is collected and recirculated to the leaching step.

The combined solid fractions are dried in a fluid bed dryer to a dry matter content of approx. 95%.

Example 12

Leaching in a Batch Process at Room Temperature at pH 4.5 of a SBM from Three Different Sources [SBM395, SBM466, SBM478]; Determination of Removal of Oligosaccharides A watery slurry of SBM from each of the sources with a dry matter content of 10% is pH adjusted to 4.5 with sulfuric acid at room temperature, and the suspension was stirred for 30 minutes while keeping this constant pH.

The leached mixture was transferred to a cloth and separated into a liquid phase and a solid product.

The oligosaccharide content in the solid product is determined in 10% extracts by the following procedure: 10% watery slurries of each solid product and its reference raw SBM, were made. The slurries were left with stirring for 30 minutes at room temperature. The liquid fraction in each slurry was collected by centrifugation 3000×g for 10 minutes, and its oligosaccharide content was determined by TLC analysis. The results are shown in table 5.

TABLE 5

|  | Oligosaccharides (of dry matter) | | Oligosaccharides |
| --- | --- | --- | --- |
| Source | Raw SBM | Solid product | extracted |
| M395 | 13.9% | 4.1% | 73.1% |
| M466 | 16.4% | 3.7% | 77.4% |
| M478 | 15.5% | 2.9% | 81.3% |

These results indicate that the extraction of oligosaccharides is very effective.

The invention claimed is:

1. A water leaching method for the manufacture of a processed, solid soya protein product, the method comprising:
   (a) leaching an initial mixture of soya bean meal (SBM) and water, wherein the SBM is milled SBM, flaked SBM, or SBM that has been disintegrated by one or more processes selected from cooking, maceration, acid pressure-cooking, alkaline pressure-cooking, and ultrasonic treatment, wherein the initial mixture has a dry matter content of between 8% and 20% by weight, for 0.15 to 6 hours at a temperature of 5 to 65° C. and a pH of 3.5 to 5.5 to obtain a leached mixture;

(b) separating the leached mixture into a liquid extract and a first solid fraction and collecting the first solid fraction;

(c) optionally, subjecting the liquid extract to further separation of solids to obtain a second solid fraction, and combining the second solid fraction with the first solid fraction to obtain a combined solid fraction; and (d) drying the first solid fraction or the combined solid fraction to a dry matter content of at least 90% by weight to obtain the processed, solid soya protein product;

wherein the total weight of water spent in steps (a) to (d) of the method is ten times the weight of the SBM or less, wherein the processed, solid soya protein product comprises protein in an amount of 65-75% by weight of dry matter, has a protein to potassium weight ratio of about 65:1 or greater and a dry matter content of about 90% by weight or greater, has an isoflavone content of about 0.1% or greater, by weight of dry matter, a potassium content of 1.1% or less, by weight of dry matter, and a sodium content of 0.1% or less by weight of dry matter, and wherein about 65% by weight or greater of the indigestible oligosaccharide content of the SBM has been removed.

2. The method according to claim 1, further comprising one or more of the following steps:

(e) subjecting the liquid extract to further separation of solids to obtain a second solid fraction and a second liquid extract, and combining the second solid fraction with the first solid fraction to obtain a second combined solid fraction;

(f) subjecting one or more of (i) the liquid extract and (ii) the second liquid extract to ultrafiltration to obtain a third solid fraction and a third liquid extract, and optionally subjecting the third liquid extract to reverse osmosis to obtain a liquid concentrate and pure water, and combining the third solid fraction with the first solid fraction to obtain a third combined solid fraction;

(g) re-using one or more of (i) the liquid extract(s) and (ii) pure water by re-circulating one or more of (i) the liquid extract(s) and (ii) water to any one or more of the steps (a), (e) and (f); and (h) drying the combined solid fractions to a dry matter content of at least 90% by weight.

3. The method according to claim 1, wherein the initial mixture further comprises biological material from other biomass sources selected from grasses, cereals, seeds, nuts, beans, peas, and mixtures thereof.

4. The method according to claim 1, further comprising a step of de-watering the solid fraction or combined solid fractions to a dry matter content of about 20% by weight or greater before the drying step.

5. The method according to claim 1, wherein the leaching is performed at a temperature of 5 to 50° C.

6. The method according to claim 1, wherein the leaching is performed at a pH of 3.5 to 5.

7. The method according to claim 1, wherein the leaching is performed in one or more interconnected paddle worm or continuous worm conveyers or a continuous stirred tank reactor.

8. The method according to claim 2, wherein the first liquid extract is subjected to separation of solids before re-use in a further leaching step.

9. The method according to claim 1, which method comprises one or two leaching steps.

10. A processed, solid soya protein product derived from soya bean meal (SBM), obtained by a method according to claim 1, wherein the processed, solid soya protein product comprises protein in an amount of 65-75% by weight of dry matter, and has a protein to potassium weight ratio of 65:1 or greater, a dry matter content of 90% by weight or greater, an isoflavone content of about 0.1% or greater, by weight of dry matter, a potassium content of 1.1% or less, by weight of dry matter, and a sodium content of 0.1% or less by weight of dry matter, and wherein at least 65% by weight of the indigestible oligosaccharide content of the SBM has been removed.

11. The method of claim 1, wherein the potassium content of the processed, solid soya protein product is about 1% or less, by weight of dry matter.

12. The method of claim 1, wherein the processed, solid soya protein product has a magnesium content of about 0.3% or less, by weight of dry matter.

13. The method of claim 1, wherein the protein to potassium weight ratio of the processed, solid soya protein product is at least 70:1.

14. The method of claim 1, wherein in the processed, solid soya protein product, one or more of:
about 50% by weight or greater of potassium content of the SBM has been removed;
about 30% by weight or greater of magnesium content of the SBM has been removed;
and calcium content and copper content are substantially unchanged in comparison with the SBM.

15. The method of claim 1, wherein in the processed, solid soya protein product one or more of: (i) iron content is increased by about 15% by weight or greater in comparison with iron content in the SBM; and (ii) the processed, solid soya protein product comprises about 130 mg/kg or greater iron, by weight of dry matter.

16. The method of claim 1, wherein the processed, solid soya protein product has an indigestible oligosaccharides content of 3.0% or less, by weight of dry matter.

17. The method of claim 1, wherein the processed, solid soya protein product further comprises, on a dry matter basis, one or more of: (i) about 20 mg/kg or more zinc; and (ii) about 15 mg/kg or more manganese.

* * * * *

UNITED STATES PATENT AND TRADEMARK OFFICE
CERTIFICATE OF CORRECTION

PATENT NO. : 11,627,748 B2  
APPLICATION NO. : 16/346456  
DATED : April 18, 2023  
INVENTOR(S) : Ellegård et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 177 days.

Signed and Sealed this  
Thirty-first Day of December, 2024

Derrick Brent  
*Acting Director of the United States Patent and Trademark Office*